H. Seitz,
Bridle,
№ 5,804. Patented Sept. 26, 1848.

UNITED STATES PATENT OFFICE.

HENRY SEITZ, OF MARIETTA, PENNSYLVANIA.

BRIDLE.

Specification of Letters Patent No. 5,804, dated September 26, 1848.

*To all whom it may concern:*

Be it known that I, HENRY SEITZ, of the town of Marietta, in the county of Lancaster and State of Pennsylvania, have invented a new and useful Improvement in Bridles, which is described as follows, reference being had to the annexed drawings of the same, making part of this specification.

Figure 2:
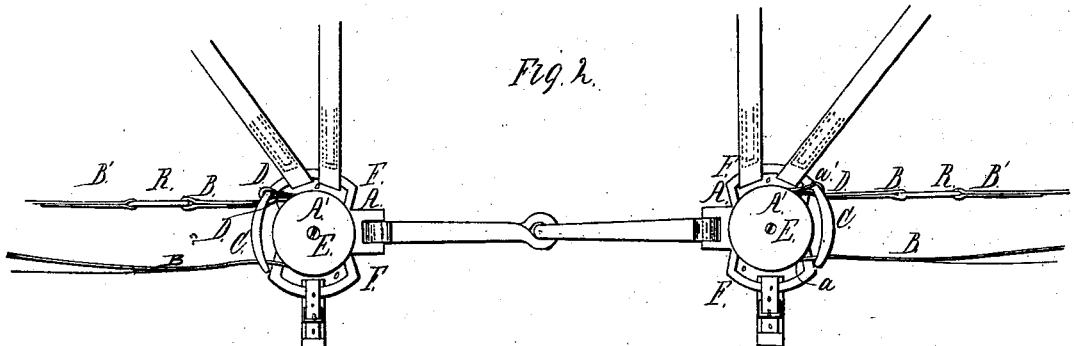
Figure 3:
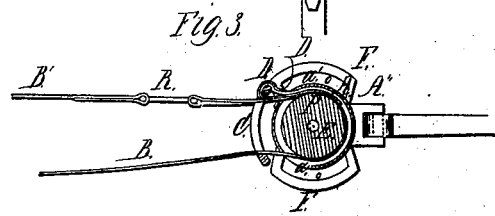
Figure 4:
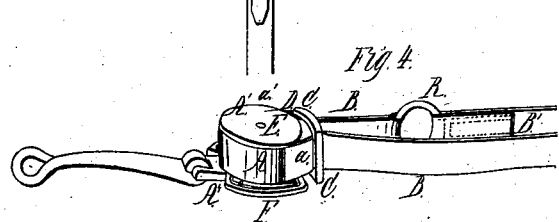
Figure 5:
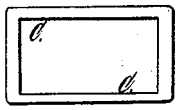
Figure 1:
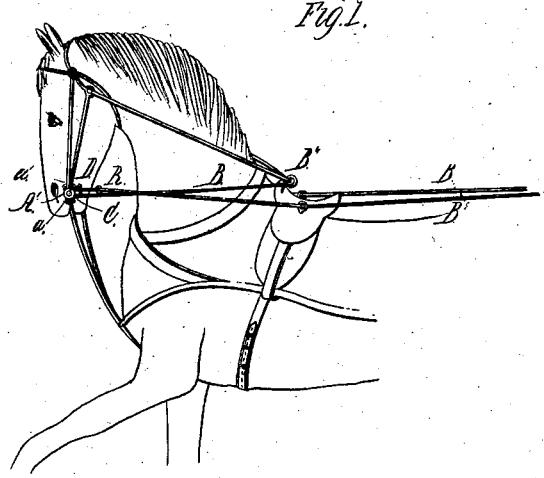

Figure 1, represents the bridle as applied to a horse harnessed to a carriage. Fig. 2, is a plan of cylinders, bit, and parts of the head-stall straps and reins. Fig. 3, section of one of the cylinders, wheel and axle showing the openings in the periphery of the cylinder through which the reins pass to and from the pulley therein. Fig. 4, is a perspective view of one of the cylinders, a stop, and part of the rein and half of the bit. Fig. 5, is a plan of one of these stops.

Similar letters in the several figures refer to corresponding parts.

In Smith's bridle, patented in 1842, the head of the animal to which the bridle was affixed could not be reined up and maintained in a steady position; but on the contrary on account of his reins being attached to the martingale or straps near the breast of the horse and having no stops to rest against the pulleys and cylinder to stop the motion of the reins and pulleys, would, when pulled, draw down the horse's mouth toward his fore legs causing him not only to have a disagreeable appearance, but to stumble and become unmanageable.

To remedy this evil I attach two sliding loop stops C, C, to the reins B, above or below the center of the cylinders, for the purpose of arresting the motion of the reins and pulleys, said stops being in the form of four sided metallic loops, or of any convenient form. C, C, in Fig. 2, represents a right and left stop. C in Fig. 5, shows a plan of the stop. This stop is attached by one of its ends to the rein, by means of a loop strap D, which is sewed to the rein so as to bring the concave side of the stop C next the periphery of the cylinder. A represents the cylinder, barrel, or case. This is generally made of polished steel, brass, or any suitable material, of a proportionable size, having one of its heads or ends A′ removable by loosening a screw E, which passes through the other head and through the pulley (serving as its axle) being screwed into the head A′. The other head A″ forms part of the cylinder and is of greater diameter forming flanges F which are perforated with openings o o for the insertion and attachment of the ends of the headstall and martingale and other straps. The periphery of the cylinder is slit with two oblong openings a a′ for the rein to pass through, after being passed around the pulley. The pulley P is made of less diameter than the interior of the cylinder for the purpose of allowing space for the rein to work freely over the pulley. This space, however, must be less than the thickness of the loop D that attaches the stop C to the rein and rein combined for the purpose of arresting the motion of the pulley and rein on the arrival of the loop D at the opening a′, by crowding or pressing against the pulley and cylinder as shown in Fig. 3.

The drawings (Fig. 2) represent two of these cylinders and pulleys attached to the ends of a common snaffle bit, although it will be apparent that they can be attached to any description of bit.

Figs. 1, 2 and 3 represent the ends of the reins B B commencing at ring R, and to which the stops C C are attached, as being passed through the upper openings a′ a′, and around the pulleys P P, and out at the lower openings a a, and their ends brought together and buckled at B² Fig. 1, and attached to the bridoon hook of a harness saddle having rings R R at their opposite ends to which the ordinary lines B′ are attached, leading to the driver. In adjusting the bridle for a trotting horse and after he has been properly reined up the tension will be on the reins B and he will be prevented from throwing his head out of position by the loop strap D coming against the pulley and cylinder—said loop strap D, which is of a wedge like form, being drawn between the convex surface of the pulley and the concave surface of the cylinder and thus arresting the motion of the pulley and rein, causing the head of the animal to be held erect and steady and preventing him from stumbling and giving him a fine carriage and gait and causing him to look well and to travel well—the driver at the same time pulling the lines B′, B′, with just so much power as to keep them in a state of tension sufficient to guide by without starting the pulleys.

In case the horse should run off the driver then pulls the reins B' B' with additional power which moves the reins, turns the pulleys, and causes the reins and pulleys when thus moved to act on the bit on the principle of the flexible line and running pulley, giving the driver complete control over the animal to stop him immediately.

This bridle may be applied to a riding horse by simply shortening the lines to guide by and placing the ends B B to which the stops are attached over the pommel of the saddle.

The use of this bridle removes the objection to riding or driving a horse with a hard mouth, whereby the arms of the rider or driver are kept constantly aching by the effort to hold such a horse—the strain being transferred to the parts of the reins serving as supports or braces by the agency of the before described stops—and attachment to the bridoon hook or pommel—the rider having only to hold the reins with that degree of tension necessary to feel the mouth of the animal, to guide and direct him kindly, without chafing his lips by irregularity of action of the reins.

The cylinder may be made of light leather and embellished in an appropriate manner. The buckle of one of the straps B must, of course, be sewed on, after it shall have been passed around the pulley P.

What I claim as my invention and desire to secure by Letters Patent, is—

1. The employment of the stops C, C, attached to the reins B B in combination with the cylinders A A containing the pulleys P and axles E arranged and operated in the manner and for the purpose set forth.

2. I also claim the employment of the perforated flanged cylinders A and wheels P in combination with the bit in the manner and for the purpose set forth.

In testimony whereof I have hereunto signed my name before two subscribing witnesses this twenty ninth day of April, 1848.

HENRY SEITZ.

Witnesses:
  WM. P. ELLIOT,
  L. WASHINGTON, Sr.